Feb. 15, 1966 W. H. SCHNACKE 3,235,315
TRACK LINK ASSEMBLY SEAL
Filed June 3, 1964
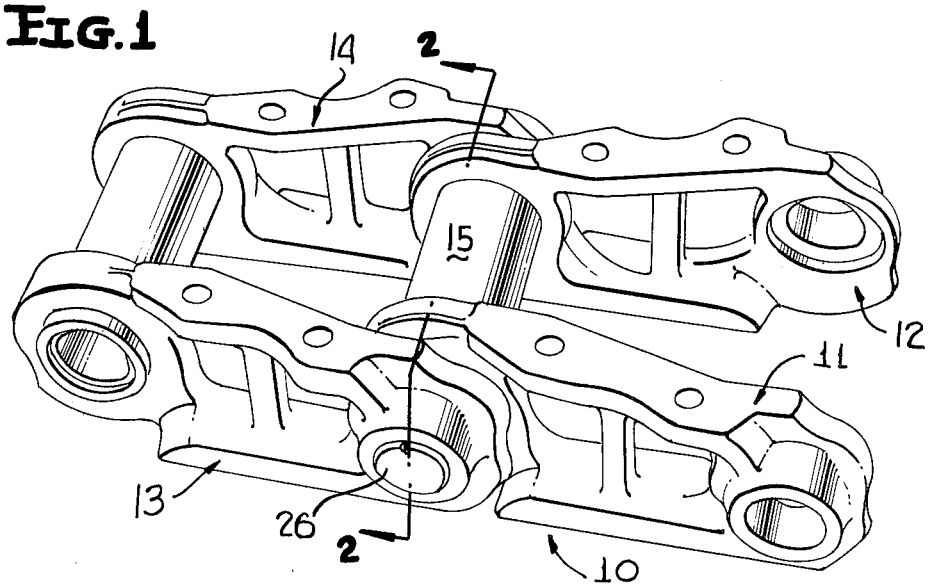
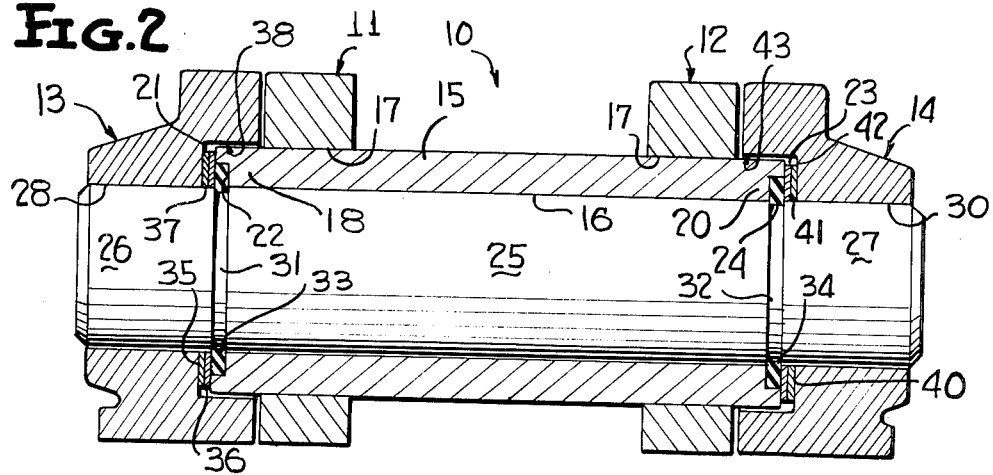
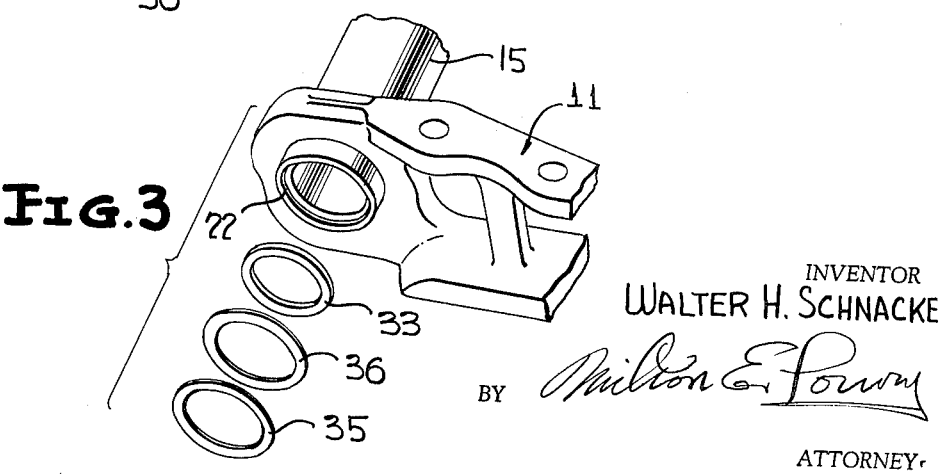
INVENTOR
WALTER H. SCHNACKE
BY
ATTORNEY United States Patent Office 3,235,315
Patented Feb. 15, 1966

3,235,315
TRACK LINK ASSEMBLY SEAL
Walter H. Schnacke, R.R. 4, Kleitz Road,
Evansville, Ind.
Filed June 3, 1964, Ser. No. 372,169
3 Claims. (Cl. 305—11)

This invention relates to a novel seal for track link assemblies forming endless tracks of the type commonly used on such vehicles as crawler tractors.

Tracks of the endless type are conventionally used on vehicles which operate on terrain which varies in texture, contour, etc., and under weather conditions varying between extreme dryness to extreme dampness. During the operation of such conventional tracks under extremely dry conditions the tracks are continually enveloped in dust, while under wet conditions water, sand, dirt, grit and other foreign matter is continually washed against the tracks. The entrance of dust, dirt, grit and other foreign matter into the conventional track link assemblies of the endless type tracks causes moving parts, such as track pins and track bushings, to wear excessively.

Just as important as preventing foreign matter from attacking the track link assemblies is the retention of lubricant in the tracks so that parts are free to move and will not bind.

Furthermore, conventional endless tracks are usually constructed of metal (steel) which, of course, move more freely and will wear less when properly lubricated. When conventional seals break down foreign matter first mixes with the lubricant and acts as an abrasive with the lubricant acting as a carrier flowing through areas of relatively small tolerances causing excessive wear of almost every movable part in an endless track. After the lubricant dries out or runs out the bare metal-to-metal contact between moving parts again causes continued wear of the track.

Finally, when a vehicle of the endless track type is operating on uneven surfaces, as is usually the case, extremely high forces are set up in the tracks and act directly against conventional track seals. These forces eventually wear out, rupture or otherwise destroy the seals causing loss of lubricant and the attended excessive wear of moving parts heretofore noted. This is particularly true when such vehicles are operating on side inclines which apply high side thrust forces to the track seals. These forces cause undesirable deflections in the track link assemblies resulting in the destruction of the seals, and eventual loose or unstable linkages in the endless track.

It is, therefore, an object of this invention to provide a novel track link assembly and seal which substantially prevents foreign material from entering the track link assembly, retains lubricant between the track pin and the track bushing of such assemblies, and reduces the undesirable deflection and attended seal destruction common in conventional endless tracks.

A further object of this invention is to provide a novel track link assembly which includes a first link secured to a track bushing and a second link secured to a track pin, an axial recess being formed in an end portion of the track pin, a recess in the second link receiving and housing the end portion of the track pin, a gasket of plastic material positioned wholly within the recess in the end portion and at least a single metallic sealing member between opposed axial faces of the end portion and the recess in the second link whereby the bushing is generally constrained against deflection by the recess in the second link and the gasket is generally uneffected by axial forces.

A further object of this invention is to provide a novel track link assembly of the type just described in which the pin is provided with a circumferential groove and the gasket is also positioned partially within this groove.

With the above and other objects in view that will hereinafter appear, the nature of the invention will be more clearly understood by reference to the following detailed description, the appended claims and the several views illustrated in the accompanying drawing.

In the drawing:

FIGURE 1 is a top perspective view of a track link assembly, and illustrates two pairs of links pivotally journaled together by a track bushing and a track pin.

FIGURE 2 is an enlarged sectional view taken generally along the line 2—2 of FIGURE 1 with the track pin being shown in elevation for clarity, and illustrates the specific construction of two identical track seals of this invention.

FIGURE 3 is a partial fragmentary and partial exploded view of the track link assembly and seal of this invention, and illustrates a resilient gasket and a pair of washers prior to being assembled in one of the links of the track link assembly.

A novel track link assembly is best illustrated in FIGURE 1 of the drawing, and is generally designated by the reference numeral 10. The track link assembly 10 forms a portion of an endless track (not shown), and includes a pair of first links or link members 11 and 12 and a second pair of substantially identical links or link members 13 and 14. A track bushing or sleeve 15 having a cylindrical bore 16 is press-fit in an identical opening 17 in each of the first links 11 and 12, as is best illustrated in FIGURE 2 of the drawing. An identical end portion 18 and 20 of the track bushing 15 projects axially outwardly beyond the respective links 11 and 12. An axial face 21 of the end portion 18 is annularly recessed at 22, while a substantially identical axial face 23 of the end portion 20 is provided with an annular recess 24.

A track pin 25 is freely rotatably received in the bore 16 of the track bushing 15. The track pin 25 includes oppositely directed end portions 26 and 27 press-fit into respective bores or openings 28 and 30 in the second links 13 and 14, respectively. A circumferential sealing groove 31 is formed in the track pin 25 adjacent the recess 22 in the end portion 18 of the track bushing 15. A similar circumferential sealing groove 32 is also formed in the track pin 25 adjacent the recess 24 in the end portion 20 of the track bushing 16. The axial width of the grooves 31 and 32 is substantially identical to the axial depth of the recesses 22 and 24 formed in the respective end portions 18 and 20 of the track bushing 15.

A resilient annular gasket or sealing member 33 which is preferably composed of plastic material, such as neoprene, is seated wholly in the axial recess 22 and the circumferential sealing groove 31. A substantially identical annular gasket or sealing member 34, similarly preferably composed of a plastic material, such as neoprene, is seated wholly within the axial recess 24 in the end portion 20 of the track bushing 15 and the circumferential sealing groove 32 of the track pin 25. The gasket 33 is, of course, inserted in the axial recess 22 in the end portion 18 of the track bushing 15 prior to the force fitting of the link 13 on the end portion 26 of the track pin 25. This is clearly illustrated in FIGURE 3 of the drawing showing a position of the gasket 33 prior to being inserted into the axial recess 22 in the track bushing 15. The assembly of the gasket 34 into the axial recess 24 of the track bushing 15 is also accomplished before the press-fit securement of the link 14 to the end portion 27 of the track pin 25.

A pair of identical metallic thrust washers 35 and 36, which are preferably constructed from hard steel, are positioned between the axial face 21 of the track bushing 15 and an annular face 37 of a counterbore or recess 38 in the link 13 opposing the axial face 21 and substantially housing the entire end portion 18 of the track bushing 15. A pair of substantially identical metallic thrust washers 40 and 41, also preferably constructed from hard steel, are similarly positioned between the axial face 23 of the end portion 20 and an opposing face 42 of a generally annular recess or counterbore 43 in the link 14 which receives and houses the end portion 20 of the track bushing 15.

The thrust washers 35 and 36 are fitted on the end portion 26 of the track pin 25 prior to the press-fitting of the link 13 upon the end portion 26 and subsequent to the insertion of the gasket 33 into the recess 22 of the thrust bushing 15 (FIGURE 3). After the assembly of the gasket 33 and the washers 35 and 36, the link 13 is then press-fit upon the end portion 26 of the track pin 25.

The thrust washers 40 and 41 are assembled upon the opposite end portion 27 of the track bushing 15 in substantially the same manner as the assembly of the thrust washers 35 and 36, after which the link 14 is similarly press-fitted upon the end portion 27 of the track pin 25.

Many important features of the track link assembly 10 and the sealing thereof in the manner just described are to be particularly noted. First, the thrust washers 35, 36 and 40, 41 form a primary seal which substantially prevents the entrance of grit, dust, dirt and other foreign material into the bore 16 of the track bushing 15, and secondarily, the washers 35, 36 and 40, 41 take up end thrust or axial thrust between the respective faces 21, 37 and 23, 42. Since the metallic thrust washers 35, 36 and 40, 41 take up a majority of such side or axial thrust, less wear is imparted to the gaskets 33 and 34 and the seal-life thereof is extended.

Secondly, the gaskets 33 and 34 prevent lubricant (not shown) between the track bushing 15 and the track pin 25 from escaping outwardly while simultaneously preventing the entrance into the bore 16 of any material which may have passed the respective thrust washers 35, 36 and 40, 41. The partial seating of the gaskets 33 and 34 in the respective circumferential sealing grooves 31 and 32 also establishes an irregular path of travel for lubricant tending to leave the bore 16 or foreign matter attempting to enter the bore 16.

Finally, because the end portions 18 and 20 of the track bushing 15 are substantially wholly received and housed within the respective counterbores or recesses 38 and 43 there is relatively little opportunity for the bushing 15 and pin 25 to deflect an appreciable amount relative to the links 13 and 14. Any such deflection is limited by the extremely close tolerance between the external circumferential surface portions of the end portions 18 and 20 with respect to the internal circumferential portions of the recesses 37 and 43, respectively.

From the foregoing, it will be readily apparent that advantageous and novel provision has been made for sealing a track link assembly of an endless track in a novel manner heretofore not provided for in the prior art. However, the variations in the disclosed embodiment of the invention within the skill of persons trained in the art is considered within the scope of this invention which is to be limited solely by the scope and spirit of the claims.

What is claimed is:

1. A track link assembly comprising first and second pivotable link members, said first link member being secured to a tubular bushing adjacent an end portion thereof, a pin passed through said bushing and secured to said second link member, an axial recess in said end portion, a recess in said second link member, the end portion being received and housed in the recess of the second link member, a resilient seal positioned wholly within said axial recess, and at least another seal between opposing axial faces of said end portion and the recess in said second link member, said pin having a circumferential groove, and said resilient seal being positioned within said groove.

2. A track link assembly comprising at least two pairs of first and second pivotable link members, each of said first link members being secured to a tubular bushing adjacent opposite end portions thereof, a pin passed through said bushing and secured to each of said second link members, an axial annular recess in each of said end portions, a recess in each of said second link members receiving and housing an associated one of said end portions, a resilient seal positioned wholly within each of said axial recesses, and at least another seal between opposing axial faces of each of said end portions and the recesses of said second link members, said pin having a circumferential recess adjacent each annular recess, said resilient seals each being positioned within one of said respective grooves.

3. The track link assembly as defined in claim 1 wherein the recess in said second link member includes an inner circumferential surface in slightly spaced relationship to an outer circumferential surface of said end portion.

References Cited by the Examiner

UNITED STATES PATENTS

| | | | |
|---|---|---|---|
| 1,289,408 | 12/1918 | Davis | 305—11 |
| 1,524,298 | 1/1925 | Gilliland | 305—11 |
| 2,301,654 | 11/1942 | Yauch | 277—92 |
| 2,468,924 | 5/1949 | Courtier | 277—188 |
| 2,906,562 | 9/1959 | Burgman | 305—11 |
| 3,050,346 | 8/1962 | Simpson | 305—11 |

BENJAMIN HERSH, *Primary Examiner.*

R. J. JOHNSON, *Assistant Examiner.*